May 22, 1951
R. L. LONGINI ET AL
2,554,257
PROTECTION OF PHOSPHORS FROM
ATTACK BY ALKALI VAPORS
Filed Dec. 14, 1949
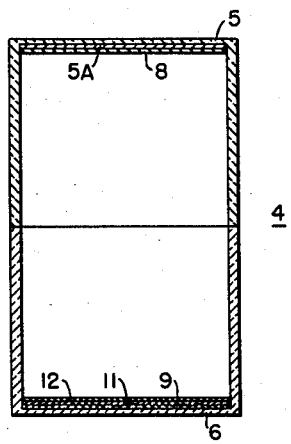
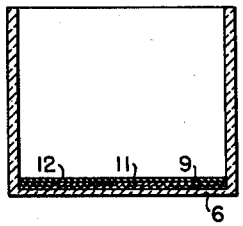
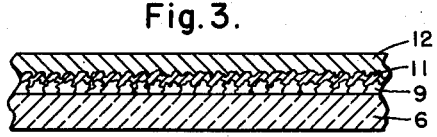
WITNESSES:
Robert A. Baird
W. C. Groove
INVENTORS
Richard L. Longini, Lloyd P. Hunter
and William M. Siebert.
BY
F. W. Lyle
ATTORNEY Patented May 22, 1951

2,554,257

UNITED STATES PATENT OFFICE 2,554,257

PROTECTION OF PHOSPHORS FROM ATTACK BY ALKALI VAPORS

Richard L. Longini, Pittsburgh, Pa., Lloyd P. Hunter, Oak Ridge, Tenn., and William McC. Siebert, Pittsburgh, Pa., assignors to Westinghouse Electric Corporation, East Pittsburgh, Pa., a corporation of Pennsylvania Application December 14, 1949, Serial No. 132,916

11 Claims. (Cl. 250—165)

Our invention relates to radiation-emitting screens and, in particular, relates to a process for making light-emitting screens for use in electrical discharge tubes in which electron images corresponding to a light image are first produced, and then a second light image which is an intensified replica of the initial light image is produced by incidence of the electron image on a fluorescent screen.

One example of an electrical discharge device of this type is shown and claimed in Lloyd P. Hunter and Richard Longini application, Serial No. 771,112, for an Image Intensifier, filed about August 28, 1947, which claims certain subject-matter herein disclosed. In the device just mentioned, an electron image is produced as a replica of an X-ray picture on a fluorescent screen; the electrons are then accelerated to high velocity and into incidence upon a screen comprising a cathode ray phosphor, and the light image produced on the latter is observed. In the electrical discharge tube just described, the photoelectric surface comprises materials such as caesium which are highly active chemically and have a vapor of a substanial pressure and there is likelihood that chemical reaction will occur between the photoelectric components and those of the screen during processing. It is, accordingly, necessary to provide some protective coating capable of preventing this reaction.

One object of our invention is, accordingly, to provide a novel type of fluorescent screen in which the fluorescent material is provided with a coating which is substantially transparent to incident electrons and is capable of preventing chemical reaction between the phosphor of the screen and caesium vapor.

Another object of our invention is to provide a protective coating for the particles comprised in a fluorescent screen which shall prevent chemical reaction between them and vapors present in the space around them.

Still another object of our invention is to provide an improved form of electron phosphor screen in which chemical reaction between phosphor and an environing atmosphere is prevented.

A still more specific object of our invention is to provide a method of protecting zinc sulphide from chemical reaction with the vapor of photoelectrically active materials.

A still further object of our invention is to provide a method of preventing chemical reaction between electron phosphors of zinc sulphide with the components of a caesiated antimony located in a common container therewith.

Other objects of our invention will become apparent upon reading the following description, taken in connection with the drawing, in which:

Figure 1 shows a view in longitudinal section of an electrical discharge tube containing an electron phosphor screen protected in accordance with the principles of our invention;

Fig. 2 is a view in section of the screen forming a wall portion of Fig. 1, and

Fig. 3 is a longitudinal section of the lower portion of the tube 4 of Fig. 1 at an intermediate point of its fabrication.

Referring in detail to the drawing, the electron phosphor screen, in accordance with our invention, comprises a layer 9 made up of particles of an electron phosphor, such, for example, as silver activated zinc sulphide, which is deposited on a portion of the wall 6 of a container 4 of glass or other suitable material. The container 4 may be a vacuum-tight enclosure, such as the tube numbered 4 in the above-mentioned Hunter and Longini application. As is illustrated in said application, the enclosure 4 may contain a substantial pressure of the vapor during processing of some photoelectric material, such, for example, as caesium used to produce the layer 8 of caesiated antimony located on a fluorescent screen 5A at one end 5 of the container 4. As has been stated above, there is a likelihood of chemical reaction between the electron phosphor of the layer 9 and vapor just mentioned, and to prevent such undesired chemical reaction, the phosphor layer 9 is protected by a layer 11 of potassium silicate which is applied in a manner about to be described.

The electron phosphor layer 9 may be deposited upon the wall portion 6 by producing a mixture or suspension of finely divided zinc cadmium sulphide in a water solution containing about 5% by weight of potassium silicate ($K_2O.2SiO_2$). The suspension may comprise about three milligrams of the electron phosphor per cubic centimeter of the liquid, and this suspension or mixture may be poured to form a layer of a predetermined depth in the container 4 at an early stage of manufacture of the latter before it is assembled into the complete electron discharge tube of which it is later to form a part. The amount of suspension poured into the container 4 should correspond with the thickness of the phosphor layer ultimately desired; for example, we have found for many purposes that a suspension of the composition just described may be poured into the container 4 to a depth of one centimeter. The container 4 is then allowed to stand for a sufficient time so that the phosphor settles in the container to form a layer all over the bottom thereof. When this has occurred, the supernatant liquid may be carefully siphoned off or even poured off, very slowly so as not to disturb the phosphor layer on the wall 6. After most of the supernatant liquid is thus removed, the layer may be allowed to dry by evaporation and be subsequently baked for thirty minutes at about 130° C. and thereafter for another thirty minutes at about 350° C. This will form a layer of the phosphor all over the wall portion 6. A water solution of potassium silicate, about 20% by weight, is prepared, and one drop of this solution is placed in the center of the phosphor layer and allowed to spread out uniformly. This spreading may be aided by spinning the container 4 at about 500 revolutions per minute about an axis perpendicular to the center of the phosphor layer. The container 4 is then baked for another thirty minutes at about 130° C. and again for a subsequent thirty minutes at about 350° C.

For many purposes the amount of protection furnished by the potassium silicate thus applied will be found adequate, but, if not, other coatings may be superposed on the first one by repeating the same process. It is, of course, desirable not to use more coatings than are necessary, since every additional coating decreases to some extent the light output from the phosphor.

As is pointed out in the Hunter and Longini application it is frequently desirable to prevent emission of light from the phosphor layer 9 to the photoelectric layer 8 by covering the protective layer 11 with a layer 12 of aluminum or the like which may be deposited from the vapor phase by methods well-known in the tube art. Patent No. 2,533,809 of W. J. Hushley and W. M. Siebert for Protection of Phosphors from Attack by Alkali Vapors describes such a metal-deposition procedure. This aluminum layer is thin enough to permit electrons impinging upon it to reach the phosphor layer 9.

The container 4 with the phosphor layer 9 and protective coating 11 thus installed may thereafter be assembled into a complete electrical discharge tube or other device by methods too well known in the glass blowing art to require description here.

While we have described the phosphor layer 9 as supported on the end wall 6 of the tube, it will be evident that a separate glass plate may be placed in the bottom of a separate container and processed in the same way as was described for end wall 6 when it is desired to form the electron phosphor screen as a unit, and to install it later in the container 4.

While I have described potassium silicate as the material used for forming the protective coating on the phosphor particles, other materials capable of forming glass-coatings without becoming porous may be used with reasonably satisfactory results. Such substances should have the property of wetting the phosphor used and also of not interfering substantially with the capability of the phosphor for transforming the energy of incident electrons into radiation of the desired wave-length or otherwise deleteriously affecting the performance of the phosphor.

I believe that the alkali metal silicates generally are satisfactory for protecting fluorescent screens when used for many purposes and in particular I have found caesium silicate, rubidium silicate and potassium borate, and mixtures of these substances, to be satisfactory for use in image intensifiers of the type referred to above.

We claim as our invention:

1. An electron discharge tube comprising a vacuum-tight container enclosing a substantial amount of caesium and having a light-emitting screen comprising a layer of electron phosphor protected by a coating consisting of one or more substances drawn from the group consisting of potassium silicate, caesium silicate, rubidium silicate and potassium borate.

2. An electron discharge tube comprising a vacuum-tight container enclosing a substantial amount of caesium and having a light-emitting screen comprising a layer of zinc sulphide protected by a coating consisting of one or more substances drawn from the group consisting of potassium silicate, caesium silicate, rubidium silicate and potassium borate.

3. A vacuum-tight container containing a surface coated with photoelectric material and another surface comprising an electron phosphor protected by a coating of potassium silicate.

4. A vacuum-tight container containing a surface coated with photoelectric material and another surface comprising zinc sulphide protected by a coating of potassium silicate.

5. A vacuum-tight container enclosing an atmosphere containing a substantial pressure of caesium and having a screen comprising an electron phosphor coated with a protective layer of potassium silicate.

6. A vacuum-tight container enclosing an atmosphere containing a substantial pressure of caesium and having a screen comprising zinc sulphide coated with a protective layer of potassium silicate.

7. An electron discharge tube comprising a vacuum-tight container enclosing an atmosphere containing a substantial pressure of caesium and having a light-emitting screen comprising a layer of electron phosphor protected by a coating of an alkali-metal silicate.

8. An electron discharge tube comprising a vacuum-tight container enclosing a photoelectric material having a light-emitting screen comprising a layer of zinc sulphide protected by a coating of an alkali-metal silicate.

9. A vacuum-tight container containing a surface coated with photoelectric material and another surface comprising zinc sulphide protected by a coating of an alkali-metal silicate.

10. A vacuum-tight container enclosing an atmosphere containing a substantial pressure of caesium and having a screen comprising an electron phosphor coated with a protective layer of an alkali-metal silicate.

11. A vacuum-tight container enclosing an atmosphere containing a substantial pressure of caesium and having a screen comprising zinc sulphide coated with a protective layer of an alkali-metal silicate.

RICHARD L. LONGINI.
LLOYD P. HUNTER.
WILLIAM McC. SIEBERT.

REFERENCES CITED

The following references are of record in the file of this patent:

UNITED STATES PATENTS

| Number | Name | Date |
|---|---|---|
| 2,092,814 | Schaffernicht | Sept. 14, 1937 |
| 2,096,986 | Von Ardenne | Oct. 26, 1937 |
| 2,185,857 | Lubszynski | Jan. 2, 1940 |
| 2,189,322 | Flory | Feb. 6, 1940 |
| 2,202,048 | Einig et al. | May 28, 1940 |
| 2,206,387 | Bruche | July 2, 1940 |
| 2,435,436 | Fonda | Feb. 3, 1948 |
| 2,446,248 | Shrader | Aug. 3, 1948 |
| 2,446,764 | Henderson | Aug. 10, 1948 |
| 2,451,590 | Tidik et al. | Oct. 19, 1948 |